(12) United States Patent
Ben Henda et al.

(10) Patent No.: US 11,895,229 B2
(45) Date of Patent: *Feb. 6, 2024

(54) STATES SECONDARY AUTHENTICATION OF A USER EQUIPMENT

(71) Applicant: Telefonaktiebolaget LM Ericsson (publ), Stockholm (SE)

(72) Inventors: Noamen Ben Henda, Vällingby (SE); David Castellanos Zamora, Madrid (ES); Vesa Torvinen, Sauvo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,826

(22) Filed: Jan. 4, 2023

(65) Prior Publication Data
US 2023/0145044 A1 May 11, 2023

Related U.S. Application Data

(63) Continuation of application No. 16/372,751, filed on Apr. 2, 2019, now Pat. No. 11,575,509, which is a (Continued)

(51) Int. Cl.
*H04L 9/08* (2006.01)
*H04L 9/40* (2022.01)
(Continued)

(52) U.S. Cl.
CPC ........ *H04L 9/0844* (2013.01); *H04L 63/0884* (2013.01); *H04L 63/0892* (2013.01);
(Continued)

(58) Field of Classification Search
None
See application file for complete search history.

(56) References Cited

U.S. PATENT DOCUMENTS

| 8,555,344 B1 | 10/2013 | Wiedmann et al. |
| 2002/0012433 A1 | 1/2002 | Haverinen et al. |

(Continued)

FOREIGN PATENT DOCUMENTS

| CA | 3042304 A1 | 5/2018 |
| CN | 101163000 A | 4/2008 |

(Continued)

OTHER PUBLICATIONS

3rd Generation Partnership Project, "3rd Generation Partnership Project; Technical Specification Group Services and System Aspects; Study on the Security Aspects of the Next Generation System (Release 14)", Technical Report, 3GPP TR 33.899 V0.6.0, Nov. 1, 2016, pp. 1-375, 3GPP.

(Continued)

*Primary Examiner* — Jamaal Henson
(74) *Attorney, Agent, or Firm* — COATS & BENNETT, PLLC

(57) ABSTRACT

A network node operates a Session Management Function (SMF) in a control plane of a core network of a wireless network. The network node authenticates a User Equipment (UE) with an Extensible Authentication Protocol (EAP) server in a secondary authentication process that uses the SMF as an EAP authenticator. The EAP server is outside of the core network and the UE is separately authenticated with a further network node in the control plane of the core network via a primary authentication process. Authenticating the UE in the secondary authentication process comprises exchanging EAP messages between the SMF and the UE and between the SMF and the EAP server. The SMF authorizes a data session between the UE and the external network through a user plane of the core network based on the UE having successfully authenticated via both the pri- (Continued)

mary authentication process and the secondary authentication process.

20 Claims, 10 Drawing Sheets

Related U.S. Application Data continuation of application No. PCT/EP2017/084383, filed on Dec. 22, 2017.

(60) Provisional application No. 62/451,645, filed on Jan. 27, 2017.

(51) Int. Cl.
*H04W 12/041* (2021.01)
*H04W 12/062* (2021.01)
*H04W 12/06* (2021.01)
*H04W 12/0431* (2021.01)
*H04W 76/25* (2018.01)
*H04W 76/11* (2018.01)
*H04W 80/10* (2009.01)
*H04W 88/02* (2009.01)

(52) U.S. Cl.
CPC .......... *H04L 63/16* (2013.01); *H04W 12/041* (2021.01); *H04W 12/0431* (2021.01); *H04W 12/062* (2021.01); *H04W 12/068* (2021.01); *H04W 76/11* (2018.02); *H04W 76/25* (2018.02); *H04W 80/10* (2013.01); *H04W 88/023* (2013.01); *H04L 63/061* (2013.01); *H04L 63/08* (2013.01); *H04L 2463/082* (2013.01)

(56) References Cited

U.S. PATENT DOCUMENTS

| | | | |
|---|---|---|---|
| 2004/0148504 A1 | 7/2004 | Forsberg | |
| 2005/0005096 A1 | 1/2005 | Miller | |
| 2005/0113067 A1 | 5/2005 | Marcovici et al. | |
| 2005/0271209 A1* | 12/2005 | Sahasrabudhe | H04L 9/12 380/270 |
| 2005/0272465 A1 | 12/2005 | Ahmavaara et al. | |
| 2006/0234742 A1 | 10/2006 | Kim et al. | |
| 2007/0162607 A1 | 7/2007 | Droms et al. | |
| 2008/0178277 A1 | 7/2008 | Oba et al. | |
| 2009/0119742 A1 | 5/2009 | Graziani et al. | |
| 2009/0172398 A1 | 7/2009 | Falk et al. | |
| 2009/0217048 A1 | 8/2009 | Smith | |
| 2011/0004762 A1 | 1/2011 | Horn | |
| 2011/0252230 A1 | 10/2011 | Segre et al. | |
| 2013/0125226 A1 | 5/2013 | Shah et al. | |
| 2013/0331063 A1 | 12/2013 | Cormier et al. | |
| 2014/0157381 A1 | 6/2014 | Disraeli | |
| 2015/0172997 A1* | 6/2015 | Griot | H04W 48/08 455/411 |
| 2015/0282042 A1 | 10/2015 | Griot et al. | |
| 2017/0078333 A1* | 3/2017 | Tevlin | H04W 12/069 |
| 2017/0171752 A1* | 6/2017 | Lee | H04W 76/12 |
| 2017/0272945 A1 | 9/2017 | Link, II | |
| 2017/0289799 A1 | 10/2017 | Hawkes et al. | |
| 2017/0332421 A1 | 11/2017 | Sternberg et al. | |
| 2018/0014178 A1* | 1/2018 | Baek | H04W 8/20 |
| 2019/0215691 A1* | 7/2019 | Salkintzis | H04W 12/106 |
| 2019/0261178 A1 | 8/2019 | Rajadurai et al. | |

FOREIGN PATENT DOCUMENTS

| | | |
|---|---|---|
| RU | 2365987 C2 | 8/2009 |
| WO | 2017004858 A1 | 1/2017 |
| WO | 2017200978 A1 | 11/2017 |
| WO | 2018053271 A1 | 3/2018 |
| WO | 2018077960 A1 | 5/2018 |

OTHER PUBLICATIONS

Aboba, B. et al., "Extensible Authentication Protocol (EAP)", Standards Track, Network Working Group Request for Comments: 3748, Jun. 1, 2004, pp. 1-67, Network Working Group.

3rd Generation Partnership Project, "3rd Generation Partnership Project; Technical Specification Group Services and System Aspects; Study on Control and User Plane Separation of EPC Nodes (Release 14)", Technical Report, 3GPP TR 23.714 V14.0.0, Jun. 1, 2016, pp. 1-87, 3GPP.

3rd Generation Partnership Project, "3rd Generation Partnership Project; Technical Specification Group Services and System Aspects; Study on Architecture for Next Generation System (Release 14)", Technical Report, 3GPP TR 23.799 V0.4.0, Apr. 1, 2016, pp. 1-92, 3GPP.

Qualcomm Inc. et al., "Way Forward on Support of Non-3GPP Access and Update to Solution 8.6 for Support of Untrusted Non-3GPP Access", SA WG2 Meeting #117, Kaohsiung City, Taiwan, Oct. 17, 2016, pp. 1-10, S2-166283, 3GPP.

3rd Generation Partnership Project, "3rd Generation Partnership Project; Technical Specification Group Services and System Aspects; Study on Architecture for Next Generation System (Release 14)", Technical Report, 3GPP TR 23.799 V1.0.0, Sep. 1, 2016, pp. 1-423, 3GPP.

3rd Generation Partnership Project, "3rd Generation Partnership Project; Technical Specification Group Services and System Aspects; General Packet Radio Service (GPRS) Enhancements For Evolved Universal Terrestrial Radio Access Network (E-UTRAN) Access (Release 13)", Technical Specification, 3GPP TS 23.401 V13.8.0, Sep. 1, 2016, pp. 1-374, 3GPP.

Zte, "Scenarios for key sharing between slices", 3GPP TSG SA WG3 (Security) Adhoc Meeting on FS_NSA, Sep. 27, 2016, pp. 1-5, S3-161317, 3GPP.

Ericsson, "Solution for UE authorization based on a secondary authentication with a third party server", 3GPP TSG-SA3 Meeting #85, Santa Cruz de Tenerife, Spain, Nov. 7, 2016, pp. 1-10, S3-161827, 3GPP.

Nokia, "Comments on contribution S3-161789 that proposes secondary authentication in the slice as the only mans of authenticating UE's access to a network slice", 3GPP TSG SA WG3 (Security) Meeting #85, Santa Cruz de Tenerife, Spain, Nov. 7, 2016, pp. 1-7, S3-161961, 3GPP.

\* cited by examiner

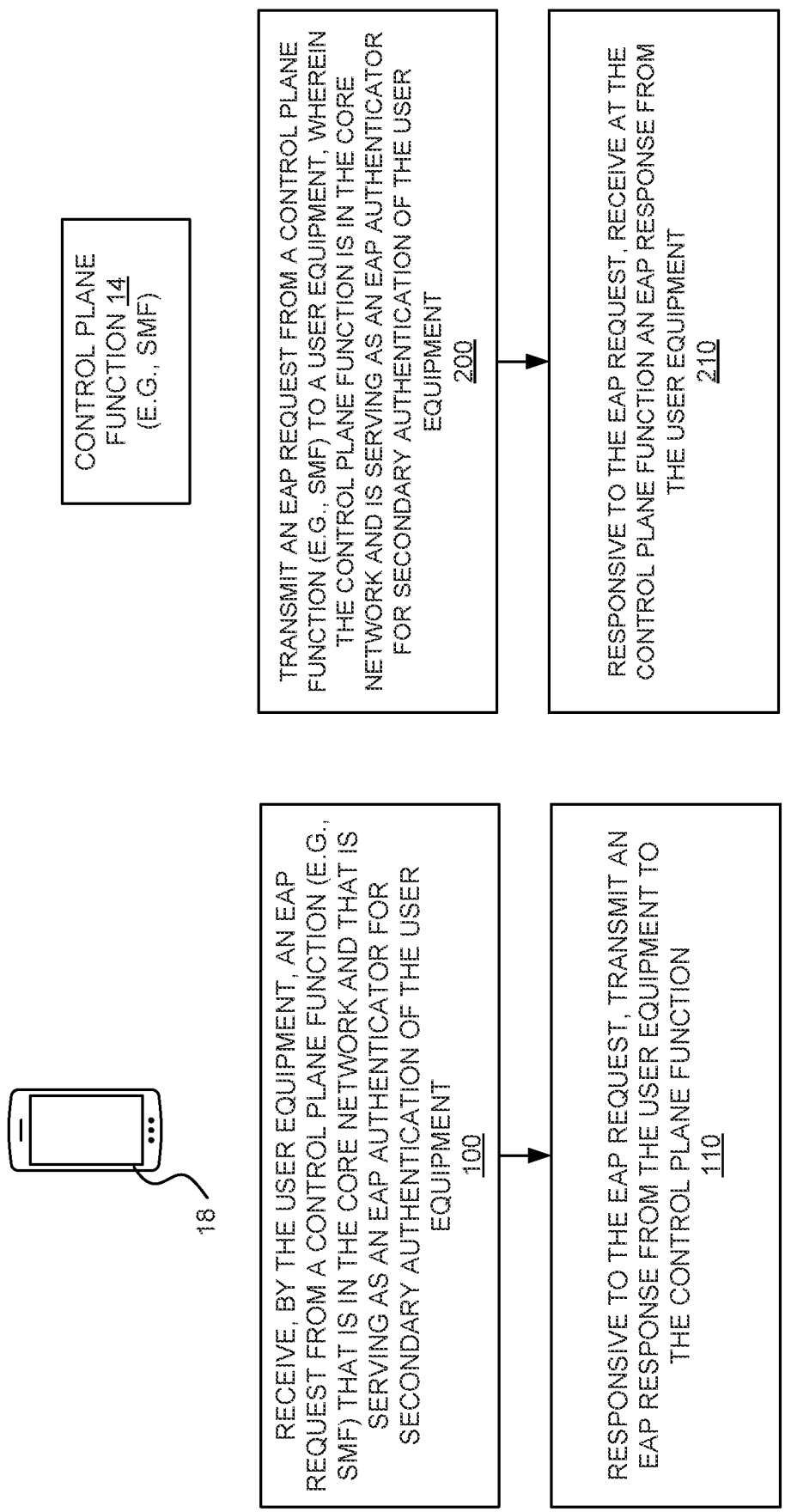

STATES SECONDARY AUTHENTICATION OF A USER EQUIPMENT

RELATED APPLICATIONS

This application is a continuation of the U.S. patent application Ser. No. 16/372,751, filed 2 Apr. 2019, which is a continuation of International Application No. PCT/EP2017/084383, filed 22 Dec. 2017, which claims priority to U.S. Provisional Patent Application 62/451,645 filed 27 Jan. 2017, the entire disclosure of each of which is incorporated by reference herein.

TECHNICAL FIELD

The present application relates generally to a wireless communication network and relates specifically to secondary authentication of a user equipment configured for use in a wireless communication network.

BACKGROUND

A wireless communication network conventionally authenticates a user equipment based on credentials that are pre-provisioned by the network operator and that are securely stored with the user equipment. Support for alternative ways to authenticate a user equipment would enable the wireless communication network to in turn support a variety of possible use cases. For example, this would allow factory owners or enterprises to leverage their own identity and credential management systems for authentication and access network security.

Supporting alternative authentication methods proves technically challenging, though. Many authentication methods have strict recommendations and requirements on the transport network. Moreover, relying on Internet Protocol (IP) connectivity for the support of alternative authentication methods proves inflexible and jeopardizes separation between the control plane and the user plane.

SUMMARY

One or more embodiments herein exploit an extensible authentication protocol (EAP) between a user equipment and a control plane function (e.g., a session management function, SMF), in order to provide authentication of the user equipment. Such authentication may be for instance secondary authentication that is performed in addition (e.g., after) primary authentication of the user equipment. Regardless, exploiting EAP in this way may prove advantageous in that it supports different types of authentication methods, is not reliant on IP connectivity or a particular type of access network, and/or is control plane based so as to keep separation between the control plane and the user plane.

More particularly, embodiments herein include a method for secondary authentication of a user equipment. The method may comprise receiving, by the user equipment, an extensible authentication protocol (EAP) request from a session management function (SMF) that serves as an EAP authenticator for secondary authentication of the user equipment, wherein the secondary authentication is authentication of the user equipment in addition to primary authentication of the user equipment. The method may also comprise, responsive to the EAP request, transmitting an EAP response from the user equipment to the SMF.

Embodiments herein also include a method for secondary authentication of a user equipment. The method may comprise transmitting an extensible authentication protocol (EAP) request from a session management function (SMF) to a user equipment, wherein the SMF serves as an EAP authenticator for secondary authentication of the user equipment, wherein the secondary authentication is authentication of the user equipment in addition to primary authentication of the user equipment. The method may further comprise, responsive to the EAP request, receiving at the SMF an EAP response from the user equipment.

In some embodiments, the SMF also serves as an EAP server that executes an EAP authentication method for the secondary authentication of the user equipment. In other embodiments, the SMF is configured to forward the EAP request and the EAP response between the user equipment and an EAP server that executes an EAP authentication method for the EAP authenticator.

Still further embodiments herein include a method for secondary authentication of a user equipment. The method may comprise transmitting an extensible authentication protocol (EAP) request from an EAP server to a user equipment via a session management function (SMF), wherein the SMF serves as a pass-through EAP authenticator for secondary authentication of the user equipment, wherein the secondary authentication is authentication of the user equipment in addition to primary authentication of the user equipment and wherein the EAP server is configured to execute an EAP authentication method for the EAP authenticator. The method may further comprise, responsive to the EAP request, receiving at the EAP server via the SMF an EAP response from the user equipment.

In some embodiments, the user equipment and the SMF are configured for use in a wireless communication network, wherein the EAP server is in a data network with which the user equipment requests a user plane session, wherein the secondary authentication of the user equipment is authentication of the user equipment to establish the user plane session, and wherein the secondary authentication is delegated by the wireless communication network to the data network.

In some embodiments, the EAP request and the EAP response are transmitted between the SMF and the EAP server via a user plane function selected by the SMF. In one embodiment, for example, the user plane function serves as a proxy for the EAP server. In another embodiment, the user plane function serves as a router via which the EAP request and EAP response are transmitted transparently to the user plane function.

In any of these embodiments, the EAP request and the EAP response may be encapsulated within respective non-access stratum (NAS) protocol messages between the SMF and the UE.

In some embodiments, the transmitting and receiving are performed after the primary authentication of the user equipment by a security anchor function in a core network.

In some embodiments, a core network comprises multiple different network slices respectively dedicated to different services, wherein the secondary authentication of the user equipment comprises slice-specific authentication of the user equipment for accessing a specific network slice of the core network.

In some embodiments, the method further comprises, based on successful secondary authentication of the user equipment, obtaining a security key shared between the user equipment and the SMF.

In some embodiments, a session establishment request transmitted from the user equipment triggers the secondary authentication of the user equipment. In one such embodiment, the session establishment request includes a secondary identity of the user equipment used for the secondary authentication. Alternatively or additionally, a session establishment response transmitted to the user equipment includes either an EAP success message indicating success of the secondary authentication or an EAP failure message indicating failure of the secondary authentication.

In some embodiments, the method further comprises binding the secondary authentication of the user equipment to a channel over which the secondary authentication is performed.

In some embodiments, the method further comprises deriving, based on successful secondary authentication of the user equipment, a security key shared between the user equipment and the SMF, wherein said deriving comprises deriving the security key as a function of binding information associated with a channel over which the secondary authentication is performed. In one such embodiment, said binding information comprises one or more of: information identifying a type of an access network via which the user equipment accesses a wireless communication network; information identifying a type of a core network of the wireless communication network; information identifying a core network slice to which the user equipment is requesting access; and information identifying a type of a core network slice to which the user equipment is requesting access.

In some embodiment, the SMF is included in a 5G network.

Embodiments also include corresponding apparatus, computer programs, and carriers.

Some embodiments herein may therefore use EAP (rfc3748) for authentication between a user equipment (UE) and a potentially external authentication, authorization, and accounting (AAA) server where the SMF, a session management function in 5G core, endorses the role of the EAP authenticator. EAP payloads may be carried by the non-access stratum (NAS) protocol between the UE and the SMF. The NAS protocol is the highest stratum of the control plane. The NAS protocol may be split between NAS Mobility Management (NAS-MM), and NAS Session Management (NAS-SM), and the NAS-SM messages are carried over NAS-MM in a transparent container. The SMF interacts with a backend AAA server possibly located in an external domain. The EAP packets may be transported over AAA between the SMF and this external server in direct communication as for the Protocol Configuration Options (PCO) option or alternatively transparently over the user plane function (UPF). Another possibility would be that the EAP server is not used, and the SMF (i.e. the EAP authenticator) executes the EAP method.

Some embodiments therefore leverage EAP which provides support for many authentication methods such as EAP Transport Layer Security (EAP-TLS), EAP Authentication and Key Agreement (EAP-AKA), EAP Tunneled TLS (EAP-TTLS) and EAP Protected EAP (EAP-PEAP). One or more embodiments are based on the encapsulation of the EAP messages in the NAS protocol and thus agnostic to the type of access network (AN). Some embodiments are control plane based and therefore agnostic to the type of PDU session, i.e. Internet Protocol (IP), non-IP etc. By using EAP, some embodiments support different types of credentials and authentication methods. The EAP exchange would benefit from the protection of over the air interfaces provided by the NAS protocol. Additionally, the EAP exchange may result in the establishment of security keys to be used for e.g. the protection of the user plane towards the established Data Network.

BRIEF DESCRIPTION OF THE DRAWINGS

FIG. 6 is a logic flow diagram of a method performed by a user equipment according to some embodiments.

FIG. 7 is a logic flow diagram of a method performed by a control plane function (e.g., SMF) according to some embodiments.

DETAILED DESCRIPTION

Figure 1:
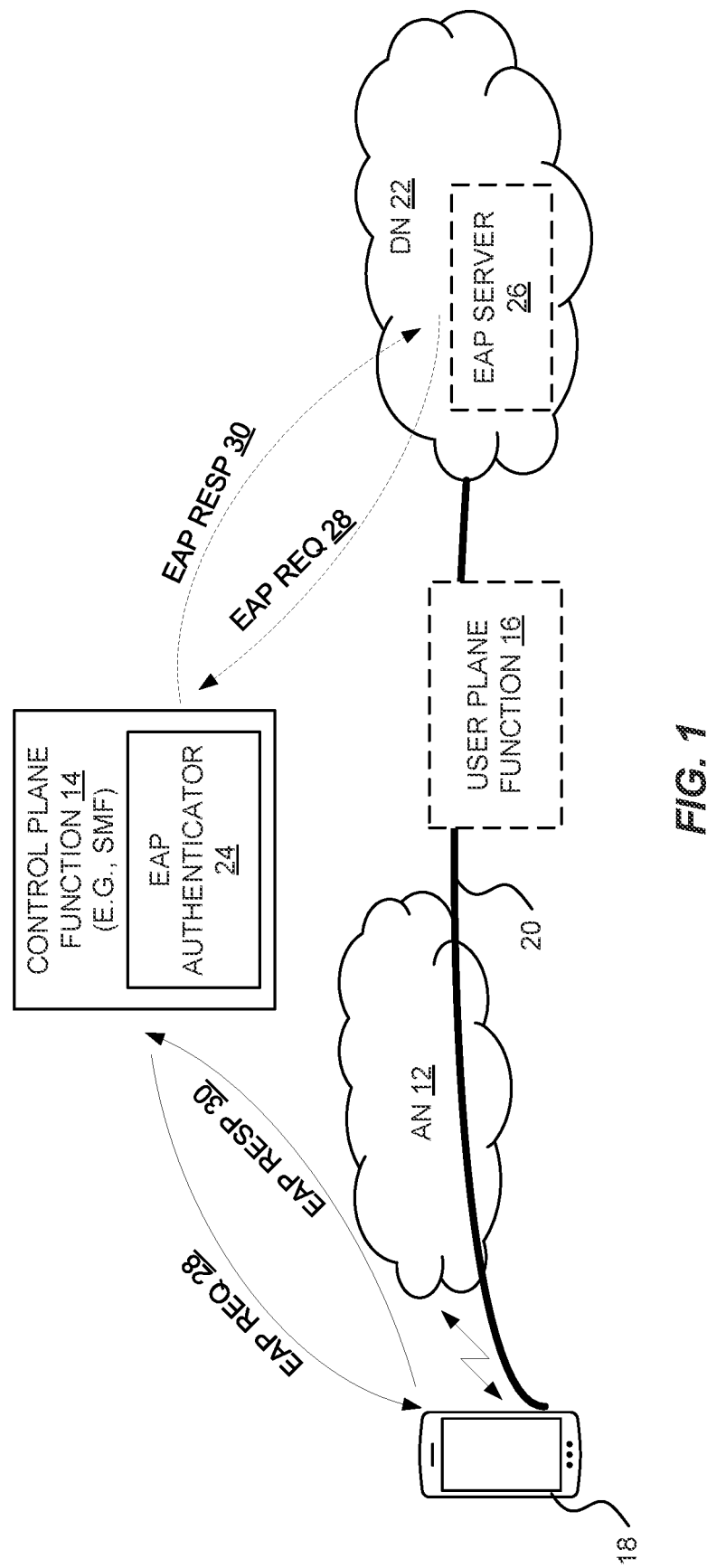
FIG. 1 is a block diagram of a wireless communication network according to one or more embodiments.

FIG. 1 illustrates a wireless communication network (e.g., a 5G network) according to one or more embodiments. The network includes an access network 12 and a core network. The core network includes one or more control plane functions, one of which is shown as control plane function 14. The core network may include for instance one control plane function in the form of a session management function (SMF) responsible for session management and a separate control plane function in the form of an access and mobility management function (AMF) responsible for mobility management. In any event, the core network also includes a user plane function 16.

As shown in FIG. 1, a user equipment 18 may request a session 20 (e.g., a user plane session or a packet data unit, PDU, session) with a data network 22 (e.g., that provides network operator services, Internet access, or 3rd party services). The data network 22 may be internal or external to the wireless communication network. Regardless, the user plane function 16 is configured to forward user plane traffic for this session, whereas the control plane function(s) are configured to control that session (e.g., via control signaling for that session).

One or more embodiments concern authentication of the user equipment 18, e.g., authentication of the user equipment 18 to establish the session 20 with the data network 22. The authentication may be secondary in nature, in the sense that it is authentication that occurs in addition to other so-called primary authentication of the user equipment (e.g., which may use pre-provisioned credentials and/or be performed by a security anchor function). In some embodiments, for example, the user equipment 12 requesting the session 20 with the data network 22 triggers such secondary authentication, e.g., after primary authentication. This secondary authentication may even be performed by, controlled by, and/or delegated to that data network 16.

One or more embodiments herein exploit an extensible authentication protocol (EAP) between the user equipment 18 and a control plane function 14 (e.g., a session management function, SMF) in the core network, in order to provide the secondary authentication of the user equipment 18. The control plane function 14 in this regard may serve as an EAP authenticator 24 for the secondary authentication. The user equipment 18 may in turn serve as a peer for EAP authentication.

In some embodiments, the control plane function 14 also serves as an EAP server that actually executes an EAP authentication method for the secondary authentication. In other embodiments, an EAP server 26 separate from the control plane function 14 (as EAP authenticator) executes an EAP authentication method for the EAP authenticator. The EAP server 26 may for instance be located in the data network 22 as shown in FIG. 1. An EAP server 26 separate from the EAP authenticator may be referred to as a backend authentication server or simply authentication server. Separating the EAP server from the control plane function 14 means that, rather than requiring the control plane function 14 to support each authentication method provided by the user equipment 18, for instance, EAP flexibly allows the control plane function 14 to act as a pass-through for some or all authentication methods that are supported by the EAP server 26. This in turn allows secondary authentication to be delegated to the data network 22 in some embodiments. Accordingly, the user equipment 18 may perform an authentication method or procedure with the EAP server 26 via, or as provided by, the control plane function 14. Such an EAP-based approach may prove advantageous in that it supports different types of authentication methods, is not reliant on IP connectivity or a particular type of access network, and/or is control plane based so as to keep separation between the control plane and the user plane.

With the control plane function 14 serving as EAP authenticator 24 for secondary authentication of the user equipment 18, the user equipment 18 and control plane function 14 may engage in an EAP authentication exchange. As shown in FIG. 1, that exchange may involve the control plane function 14 transmitting an EAP request 28 to the user equipment 18, and the user equipment 18 in turn receiving the EAP request 28 from the control plane function 14. This EAP request 28 may request any one of multiple different possible types of requestable information from the user equipment 18 (e.g., an identity, an MD5-challenge, etc.). The requested type of information may be indicated by a type field in the request 28. In any event, the EAP request 28 may request information as part of negotiating which authentication method is to be used for secondary authentication of the user equipment 18.

Responsive to the EAP request 28, the user equipment 18 (as EAP peer) may transmit an EAP response 30 to the control plane function 14 (as EAP authenticator 24). The EAP response 30 may for instance include the type of information indicated by the type field in the EAP request 28.

One or more additional sequences of requests and responses may continue in a similar manner. Such may continue until the control plane function 14 as EAP authenticator cannot authenticate the user equipment 18 (e.g., due to an unacceptable EAP response to one or more EAP requests), or until the control plane function 14 as EAP authenticator determines that successful authentication has occurred.

In some embodiments, for example, the user equipment's transmitting of a request for establishment of the session 20 triggers the secondary authentication of the user equipment 18. In this case, a session establishment response may in turn be transmitted to the user equipment and include either an EAP success message indicating success of the secondary authentication or an EAP failure message indicating failure of the secondary authentication.

In these and other embodiments, the EAP request 28 and EAP response 30 may be encapsulated within respective non-access stratum (NAS) protocol messages. NAS in this regard may be the highest stratum of the control plane. So encapsulated, the EAP request 28 and EAP response 30 may be communicated between the user equipment 18 and the control plane function 14 no matter the type of the access network 12.

In embodiments involving EAP server 26 (e.g., in the data network 22 as shown in FIG. 1) for the secondary authentication, the control plane function 14 may forward the EAP request 28 and EAP response 30 between the user equipment 18 and the EAP server 26. The control plane function 14 may for instance inspect EAP messages transmitted or received, in order to determine whether or where to forward those messages. In any event, the EAP server 26 may transmit the EAP request 28 to the user equipment 18 via the control plane function 14 as EAP authenticator, and, responsive to the EAP request, may receive via the control plane function 14 the EAP response 30 from the user equipment 18.

In some embodiments, the EAP request 28 and the EAP response 30 are transmitted between the control plane function 14 and the EAP server 26 via the user plane function 16, e.g., which may be selected by the control plane function 14. In some embodiments, the user plane function 16 may serve as a proxy for the EAP server 26. In other embodiments, the user plane function 16 serves as a router via which the EAP request 28 and EAP response 30 are transmitted transparently to the user plane function 16.

These and other embodiments may therefore allow the wireless communication network to delegate to the data network 22 the secondary authentication of the user equipment 18 (e.g., for authenticating the user equipment's establishment of the session 20 with the data network 22). Especially where the data network 22 implements the EAP server 26 that actually executes the authentication method used for such authentication, this may mean that the wireless communication network generically and flexibly supports different authentication methods.

Alternatively or additionally, the core network in some embodiments may comprise multiple different network slices respectively dedicated to different services. In this case, the secondary authentication of the user equipment 18 may comprise slice-specific authentication of the user equipment 18 for accessing a specific network slice of the core network. In a similar way, then, the wireless communication network may generically and flexibly support different authentication methods (e.g., which may be different for different network slices).

One or more embodiments will now be described in the context of 5G (a.k.a., Next Generation, NG) as being developed by 3GPP. 5G aims (among other things) to separate the control plane from the user plane. The control plane is responsible for control and transmission of signaling information, while the user plane is responsible for forwarding user traffic. Separating the control plane involves extracting the control plane functions from a gateway to leave a simpler, user-plane node. A gateway thus is "split" into S/PGW-U and S/PGW-C components that can that can scale independently, where SGW-U is the component of a serving gateway (SGW) that handles user plane functions, PGW-U is the component of a packet gateway (PGW) that handles user plane functions, SGW-C is the component of a SGW that handles control plane functions, and PGW-C is the component of a PGW that handles control plane functions. This way, the control plane, and all the associated complex interactions, can be centralized, while the user plane is distributed across the IP services fabric and scaled as required by the traffic load.

Further, 5G enables network function virtualization and software defined networking. The 5G system architecture shall leverage service-based interactions between Control Plane (CP) network functions where identified.

Moreover, 5G aims to modularize function design, e.g., to enable flexible and efficient network slicing. Further, wherever applicable, procedures (i.e., the set of interactions between network functions) are defined as services, so that their re-use is possible.

Figure 2:
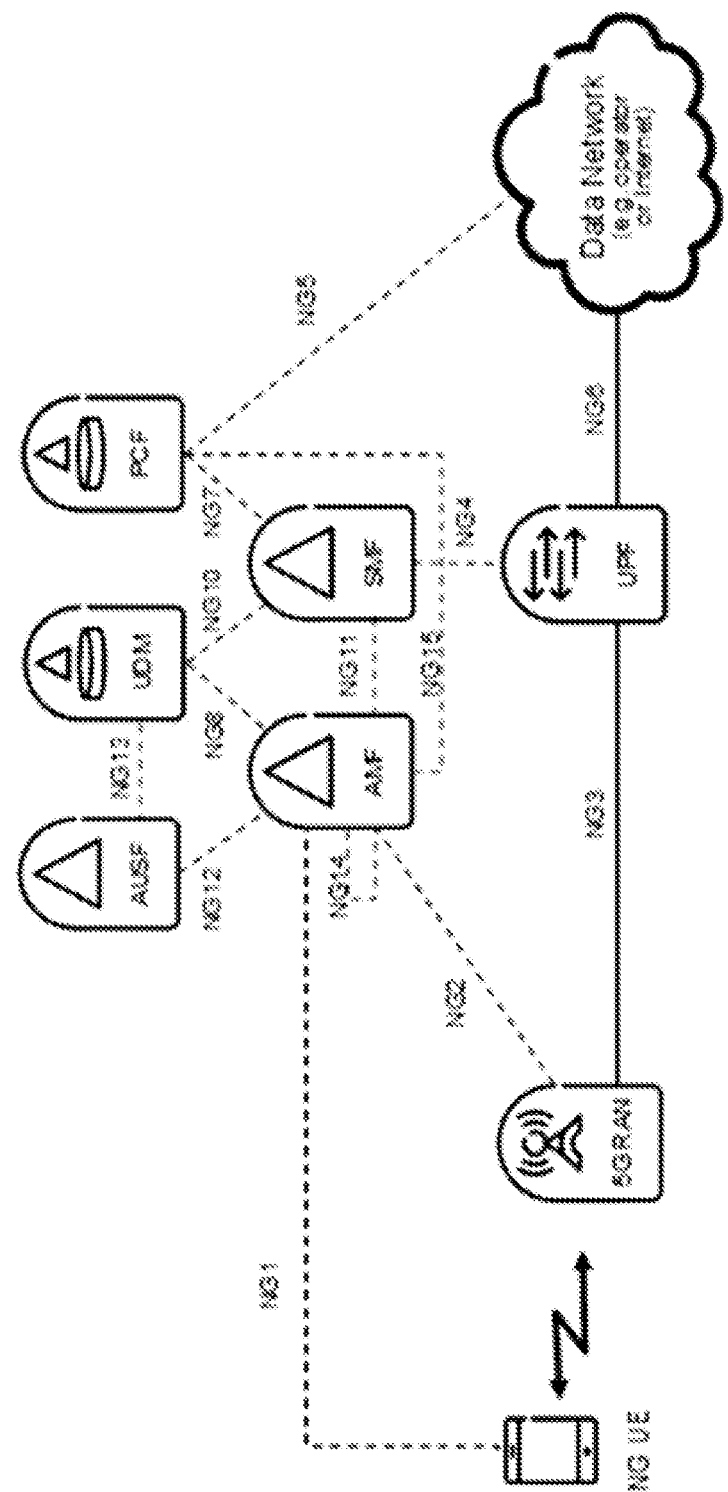
FIG. 2 is a block diagram of a 5G network according to some embodiments.

FIG. 2 in this regard depicts a baseline architecture for NG. The architecture includes various network functions. Control plane functions include a session management function (SMF), an access and mobility management function (AMF), a policy control function (PCF), an authentication server function (AUSF), and unified data management (UDM).

The SMF may include some or all of the following functionality. Some or all of the SMF functions may be supported in a single instance of an SMF. SMF functionality includes session management (e.g. session establishment, modify and release, including tunnel maintain between UPF and access network node), UE IP address allocation & management (including optional authorization), selection and control of the UP function, configuration of traffic steering at UPF to route traffic to proper destination, termination of interfaces towards policy control functions, control of part of policy enforcement and quality of service (QoS), lawful intercept (for SM events and interface to lawful intercept system), termination of SM parts of NAS messages, downlink data notification, initiation of AN specific SM information, sent via AMF over N2 to AN, determination of service and session continuity (SSC) mode of a session (for IP type PDU session), roaming functionality, handling of local enforcement to apply QoS service level agreements (SLAs) (Visited public land mobile network, VPLMN), charging data collection and charging interface (VPLMN), lawful intercept (in VPLMN for SM events and interface to LI System), and support for interaction with external DN for transport of signalling for PDU session authorization/authentication by external DN.

By contrast, the Access and Mobility Management function (AMF) may include some or all of the following functionality. Some or all of the AMF functions may be supported in a single instance of a AMF: termination of radio access network (RAN) CP interface (N2), termination of NAS (N1), NAS ciphering and integrity protection, registration management, connection management, reachability management, mobility Management, lawful intercept (for AMF events and interface to LI System), transparent proxy for routing SM messages, access Authentication, access Authorization, security Anchor Function (SEA or SEAF), and security Context Management (SCM) which receives a key from the SEA that it uses to derive access-network specific keys. With particular regard to the SEA, it interacts with the authentication server function (AUSF) and the UE, and receives the intermediate key that was established as a result of the UE authentication process. In case of USIM based authentication, the AMF retrieves the security material from the AUSF.

A user plane function (UPF) may include some or all of the following functionality. Some or all of the UPF functions may be supported in a single instance of a UPF: anchor point for Infra-/Inter-radio access technology (RAT) mobility (when applicable), external PDU session point of interconnect to Data Network, packet routing & forwarding, packet inspection and User plane part of Policy rule enforcement, lawful intercept (UP collection), traffic usage reporting, uplink classifier to support routing traffic flows to a data network, branching point to support multi-homed PDU session, QoS handling for user plane, e.g. packet filtering, gating, uplink/downlink rate enforcement, uplink Traffic verification (SDF to QoS flow mapping), transport level packet marking in the uplink and downlink, and downlink packet buffering and downlink data notification triggering.

Any of these network functions can be implemented either as a network element on a dedicated hardware, or as a software instance running on a dedicated hardware, or as a virtualized function instantiated on an appropriate platform, e.g. on a cloud infrastructure.

Among the new features in NG Systems is the concept of Network Slicing. A Network Slice (NS) is basically an instance of a core network dedicated to providing a particular service. This will allow operators to handle this wide variety of new use cases each with different service requirements in terms of Quality of Service (QoS). For example, an operator could be running a slice for usual mobile broadband (MBB) services, in parallel with a mission critical slice for public safety services (mission critical push to talk, MCPTT) requiring very low latency and in parallel with an internet-of-things (IoT) slice for electricity meters with very low bandwidth.

To support diverse service types, operators will use multiple core networks deployed as "network slices" on a common IP services infrastructure. The idea, shown in FIG. 2, is to create virtual core network instances (or "slices") dedicated to different services. Each slice can be optimized for the traffic profile and the commercial context of the associated service—for example, IoT, public safety, mobile virtual network operator (MVNO), connected car, voice over WiFi or enterprise services. Network slices can be two dimensional in the sense that they can be both service- and customer-specific It is expected that 5G will support many new scenarios and use cases and will be an enabler for the IoT. It is expected that NG systems will provide connectivity to a wide range of new devices such as sensors, smart wearables, vehicles, machines, etc. Flexibility would be then a key property in NG Systems. This is reflected in the security requirement for network access that are mandating the support of alternative authentication methods and different types of credentials than the usual AKA credentials pre-provisioned by the operator and securely stored in the universal integrated circuit card (UICC). This would allow factory owners or enterprises to leverage their own identity and credential management systems for authentication and access network security.

5G may decouple the authentication and authorization procedures for accessing different network slices (NSs). One possible scenario is the following. In order for a NG-UE to access a particular NS, the operator may first run the primary (usual) authentication for initial network access towards AUSF/UDM via AMF, followed by a secondary NS-specific authentication possibly under the control of a 3rd party. This is assuming trust between the 3rd party service provider and the mobile network operator (MNO) who for example is offering access and transport services to this 3rd party in a dedicated network slice instance.

A so called Ciphered Option Request and the use of an information element called the Protocol Configuration Options (PCO) could be relevant for the scenario described above. The PCO could transfer password authentication protocol (PAP)/challenge handshake authentication protocol (CHAP) usernames and passwords to the packet data network gateway (PDN-GW) which then runs them through an AAA server (potentially located in an external domain) for access authorization. Since this information is sensitive and needs to be protected, if the UE intends to send PCO which require ciphering (e.g., PAP/CHAP usernames and passwords), the UE shall set the Ciphered Options Transfer Flag in the Attach Request message and send the PCO only after authentication and NAS security setup have been completed.

Among the limitations of this mechanism for use or extension in NG systems are the following.

First, the mechanism is very limited in terms of possible authentication methods. Currently there is only support for PAP and CHAP. But since PAP is obsolete from a security point of view, we are only left with CHAP.

Second, in order to support other methods and use the PCO information element for the transport of authentication information, it would be required to specify special messages between the MME and the S-GW and the S-GW and PDN-GW dedicated to this purpose. This is to handle authentication methods that require more than just one round-trip.

Furthermore, it is difficult to see how this mechanism would fit in the Next Generation architecture which is going to be broken further down. In fact, taking into consideration the new architectural features (TR 23.799), we can state that there will be probably more hops in the path between the UE and the PDN-GW, for example in relation to the ongoing work on the split of the MME into an AM and an SM function (TR 23.799) and the control and user plane separation (CUPS) work for the control and user plane split (TR 23.714). This implies more overload and signaling in the CN.

Finally, this mechanism is a workaround because there is no direct protocol between the UE and the PDN-GW. Making it generic enough to support other authentication methods would be technically challenging, especially since many methods have strict recommendations and requirements on the transport.

One or more embodiments address some of these and/or other challenges for secondary authentication through the use of EAP. EAP is specified in IETF RFC 3748. EAP is an authentication framework which supports multiple authentication methods.

One of the advantages of the EAP architecture is its flexibility. EAP is used to select a specific authentication mechanism, typically after the authenticator requests more information in order to determine the specific authentication method to be used. Rather than requiring the authenticator to be updated to support each new authentication method, EAP permits the use of a backend authentication server, which may implement some or all authentication methods, with the authenticator acting as a pass-through for some or all methods and peers. The EAP protocol can support multiple authentication mechanisms without having to pre-negotiate a particular one.

In EAP nomenclature, an EAP authenticator is the end of the link initiating EAP authentication. A peer is the end of the link that responds to the authenticator. A backend authentication server is an entity that provides an authentication service to an authenticator. When used, this server typically executes EAP methods for the authenticator. An EAP server is the entity that terminates the EAP authentication method with the peer. In the case where no backend authentication server is used, the EAP server is part of the authenticator. In the case where the authenticator operates in pass-through mode, the EAP server is located on the backend authentication server. Successful authentication is an exchange of EAP messages, as a result of which the authentication decides to allow access by the peer, and the peer decides to use this access. The authenticator's decision typically involves both authentication and authorization aspects; the peer may successfully authenticate to the authenticator, but access may be denied by the authenticator due to policy reasons.

The EAP authentication exchange proceeds as follows. The authenticator sends a Request to authenticate the peer. The Request has a Type field to indicate what is being requested. Examples of Request Types include Identity, MD5-challenge, etc. Typically, the authenticator will send an initial Identity Request; however, an initial Identity Request is not required, and MAY be bypassed.

The peer sends a Response packet in reply to a valid Request. As with the Request packet, the Response packet contains a Type field, which corresponds to the Type field of the Request.

The authenticator sends an additional Request packet, and the peer replies with a Response.

The sequence of Requests and Responses continues as long as needed. The conversation continues until the authenticator cannot authenticate the peer (unacceptable Responses to one or more Requests), in which case the authenticator implementation MUST transmit an EAP Failure (Code 4). Alternatively, the authentication conversation can continue until the authenticator determines that successful authentication has occurred, in which case the authenticator MUST transmit an EAP Success (Code 3).

When operating as a "pass-through authenticator", an authenticator performs checks on the Code, Identifier, and Length fields. It forwards EAP packets received from the peer and destined to its authenticator layer to the backend authentication server; packets received from the backend authentication server destined to the peer are forwarded to it.

Figure 3:
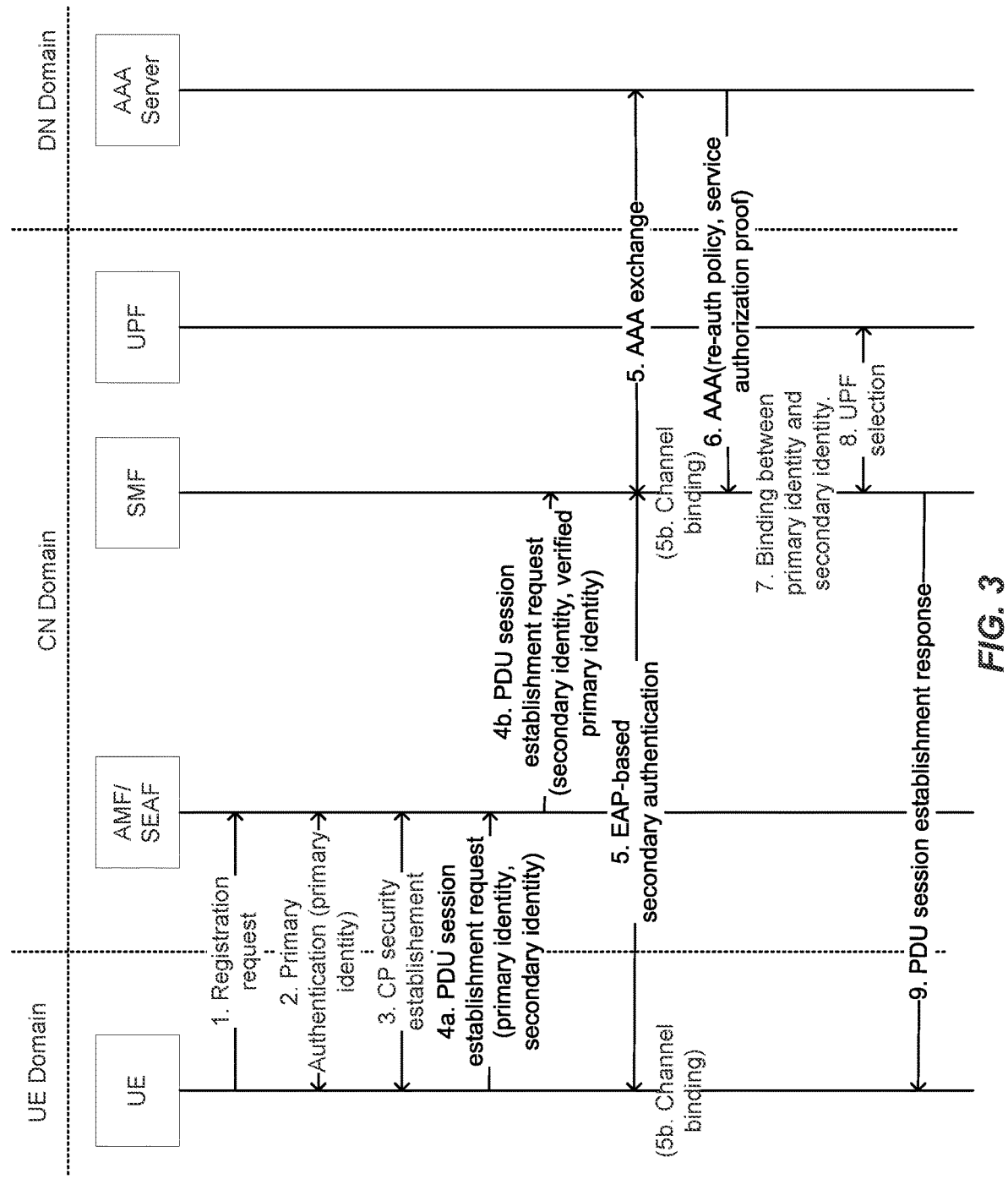
FIG. 3 is a call flow diagram for secondary authentication of a UE according to some embodiments.

FIG. 3 illustrates the flow of messages involving both a primary and a secondary authentication, using EAP, according to some embodiments.

Step 1: The UE sends a registration request.

Step 2: The primary authentication procedure is executed between the UE and the SEAF. Upon successful authentication, the primary identity (e.g. international mobile subscriber identifier, IMSI) is verified, and the next steps are executed.

Step 3: The NAS Security is set up, i.e., CP security. From now on all NAS messages are confidentiality and integrity protected.

Step 4: The handling of PDU session establishment request is done in two steps. In step 4a, the UE sends the PDU session establishment request to AMF. This message contains the primary identity and may optionally carry the secondary identity used later in the EAP secondary authentication. The request is integrity and optionally confidentiality protected between the UE and AMF. AMF verifies that the message originates from the UE that was authenticated in step 2, and forwards it including the verified identity information. In step 4b, the SMF receives a PDU session establishment request from the AMF. If the SMF has not run secondary authentication for the primary identity, and it has a local policy for authenticating the UEs, SMF must initiate the secondary authentication procedure. The SMF also maintains a re-authentication policy, and if the received primary identity was authenticated by the SMF a very long time ago, it may need to initiate re-authentication.

Step 5: The secondary authentication procedure is performed between the UE and the external AAA via the SMF. In this case, then, the SMF serves as EAP authenticator and the external AAA serves as EAP server. The EAP messages are transported over the NAS-SM protocol, transparently to AMF. This may require the specification of new NAS-SM messages that may carry SM-EAP packets, e.g. SM-authentication-request and SM-authentication-response. If the PDU session establishment request carried the secondary identity of the UE, the SMF can skip the EAP-Identity request, and initiate the EAP authentication directly with the AAA server. The EAP exchange over the air interface benefits from the protection at the NAS layer.

The secondary EAP authentication may optionally need to be bound to the channel it was run over, or otherwise there is a risk that a Man-in-the-middle tunnels EAP packets between the channels (e.g. if the same EAP method and credentials are used over various channels). Channel binding can be done by taking channel related information (e.g. the primary identity used in step 2 assuming it may include information related to the access type or core network type or the network slice related information). The channel related information is either used directly in the cryptographic operations within the secondary EAP authentication, or later when using the master key (i.e. master session key, MSK, or extended MSK, EMSK) created from the secondary authentication for some purposes. The channel information may be one of the following: access network type (e.g. 5G radio, wireless local access network WLAN), the core network type (e.g. 5G core network) or the network slice type or identifier (e.g. Network Slice Selection Assistance Information NSSAI, SM-NSSAI or Data Network Name DNN).

In particular, most EAP authentication methods create a master key (MSK and EMSK) as a result of authentication. This key is used to create session keys e.g. integrity protection key or ciphering key. The channel binding can be done in two places: a) inside EAP method when creating MSK/EMSK, and in this case the binding parameters are input values to the key derivation: MSK=KDF (binding parameters, other parameters) and/or EMSK=KDF (binding parameters, other parameters); or b) after the MSK/EMSK have been created when creating some other (master) key: Key=KDF (binding parameters, MSK) and/or Key=KDF (binding parameters, EMSK).

Step 6: As the part of the AAA exchange, the external AAA server may indicate to the SMF a re-authentication policy. This could be e.g. the maximum time after which a new authentication is required.

After successful authentication, the AAA exchange may also include the exchange of service/session authorization information to the SMF. In this case, the AAA may provide the SMF with a service authorization profile (or service authorization profile identifier/token) from which the SMF will be able to determine if the requested service is authorized for the user, and if authorized in which way the service shall be offered in terms of e.g. Quality of Service, Quality of experience, charging, etc.

Step 7: The SMF optionally makes binding between primary identity and secondary identity, and stores that locally. When SMF sees a new request from AMF that carries the primary identity, it may trust that the messages originate from the same UE that has the secondary identity.

Step 8: After successful authentication and authorization, the SMF will select a User Plane Function, UPF, for the user plane related to the service being requested.

Step 9: The SMF sends back a PDU session establishment response depending on the outcome of the secondary authentication. This message may carry the final EAP message, i.e. PDU session establishment accept may carry EAP Success or PDU session establishment failure may carry EAP Failure.

Figure 4:
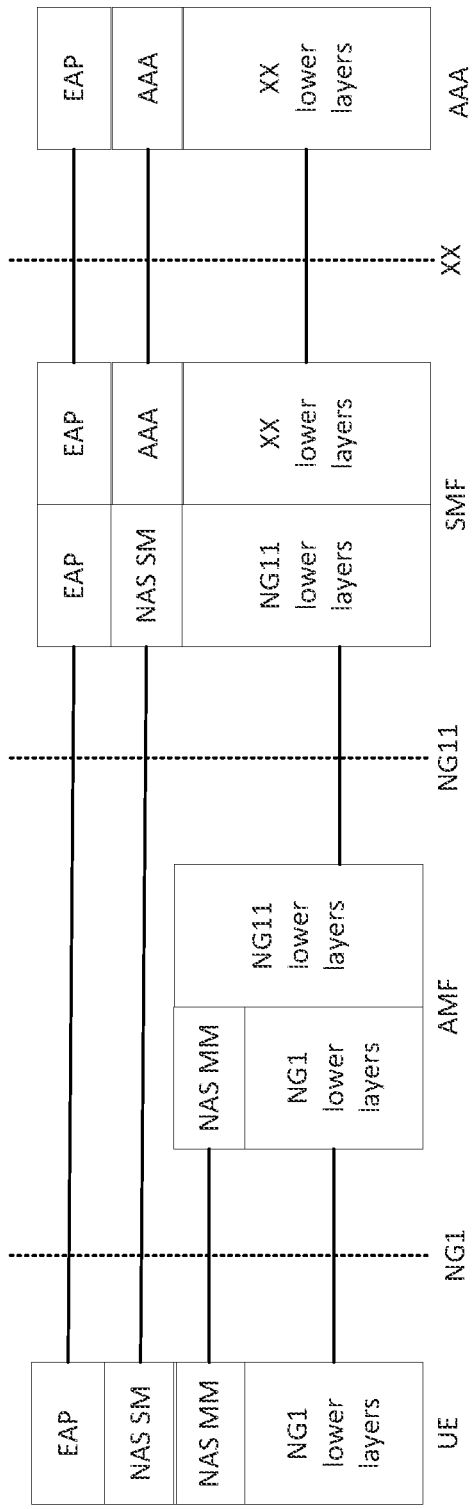
FIG. 4 is a block diagram of a protocol stack for exchanging EAP messages between a UE and AAA server according to some embodiments.

In step 5, the SMF endorses the role of the EAP authenticator and may rely on a backend AAA server in the data network, possibly in another security domain, e.g. controlled by a 3rd party. Then it is left open how the AAA messages are transported between the SMF and the AAA server. Different possibilities exist. In a first embodiment, the AAA messages are transported via a direct interface between SMF and the AAA similarly as in the EPC PCO solution. This interface is established based on business agreements when the AAA is controlled by a 3rd party. FIG. 4 shows the protocol architecture for the support of the EAP based secondary authentication with a direct interface between the SMF and the AAA server (called XX). On the UE to SMF side, it shows a possibility on how the EAP messages are carried over the NAS protocol.

Figure 5:
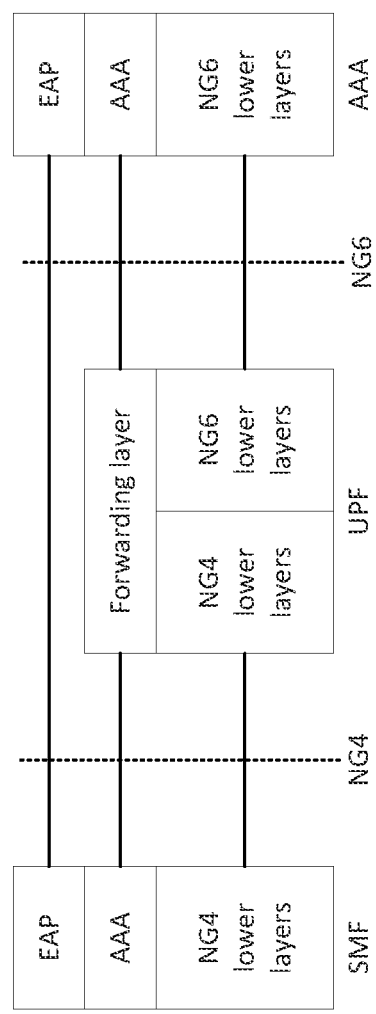
FIG. 5 is a block diagram of a protocol stack for exchanging EAP messages between an SMF and AAA server according to some embodiments.

In a second embodiment, the AAA messages are transferred transparently over NG4-NG6 interfaces through the UPF. The UPF could endorse the role of a AAA proxy or even simpler, an IP router. In this case, the SMF will execute step 8 before the AAA exchange in step 5 of FIG. 3 so it is possible to handle the AAA exchange via the selected UPF. FIG. 5 shows the support of the EAP based secondary authentication where the EAP messages are transported through the UPF over the NG4-NG6 interfaces. That is, NG4-NG6 interfaces are used transparently to carry AAA messages between SMF and AAA server. In this particular case (FIG. 5), the UPF could act as an IP router so that the AAA exchange between the SMF and the AAA server is transparent to the UPF.

In a third embodiment, the UPF may actually act as an AAA proxy.

In a fourth embodiment, the SMF may act as the EAP server and in such case there is no need for interaction with an external AAA server at all.

In a fifth embodiment, the primary identity and secondary identity are the same or related to each other e.g. (a part of) the primary identity is encoded into the secondary identity. The credentials used for authentication can still be different.

Similarly to the PCO based mechanism, the secondary authentication could be used for an additional authorization controlled by an external party upon the UE's request for the establishment of specific or additional PDU sessions. Other use cases related to the UP protection and slicing are described in the following clauses.

User plane protection: First, should protection of the UP traffic be terminated in an UPF, the following assumption is made. A user plane protection between the UE and an UPF is implemented via an additional protocol layer independently of the protection over the NGU interface between the UE and the access network.

In such case, the secondary authentication could be used to establish the necessary keys. In fact, following a successful authentication, the resulting MSK key shared between the SMF (EAP authenticator) and the UE (peer) could be used for this particular purpose.

The mechanisms for the distribution of the protection keys, algorithm negotiation and activation of the security mode would be then generic and agnostic to the authentication method. All these operations could be performed in conjunction with the PDU session establishment (step 9 in FIG. 3).

Support of Network Slicing: The secondary authentication could be used for Network Slice specific authorization. In fact, upon successful primary authentication via a certain AMF, the UE could potentially be provided services via all the Network Slices served by that particular AMF. It could be the case that the UE is automatically authorized to access all or some of the slices based on subscriptions information. Alternatively, the authorization could be enforced on a slice specific basis using the secondary authentication during the creation of a PDU session for a particular slice.

For the protection of the UP traffic between the UE and a particular slice, the mechanism described in the previous clause could be used. However, the configuration of the slices in the sense of who manages or owns which network function becomes relevant. From a trust model perspective, this would require that the UPF and SMF are slice specific; otherwise the protection would not serve any purpose.

In view of the above variations and modifications, FIG. 6 illustrates a method for secondary authentication of a user equipment 18 configured for use in a wireless communication network, e.g., that comprises an access network 12 and a core network, according to some embodiments. The method is performed by the user equipment 18. The method may comprise receiving, by the user equipment 18, an extensible authentication protocol (EAP) request 28 from a control plane function 14 that is in the core network (e.g., an SMF) and that is serving as an EAP authenticator 24 for secondary authentication of the user equipment 18 (Block 100). The secondary authentication may be authentication of the user equipment 18 in addition to primary authentication of the user equipment 18. The method may also comprise, responsive to the EAP request 28, transmitting an EAP response 30 from the user equipment 18 to the control plane function 14 (e.g., SMF) (Block 110).

FIG. 7 illustrates a corresponding method performed by the control plane function 14 (S.f., SMF). The method may comprise transmitting an extensible authentication protocol (EAP) request 28 from a control plane function 14 (e.g., SMF) to a user equipment 18, wherein the control plane function 14 is in the core network and is serving as an EAP authenticator 24 for secondary authentication of the user equipment 18 (Block 200). Again, the secondary authentication may be authentication of the user equipment 18 in addition to primary authentication of the user equipment 18. The method may also comprise, responsive to the EAP request 28, receiving at the control plane function 14 an EAP response 30 from the user equipment 18 (Block 210).

In some embodiments, the control plane function 14 is also serving as an EAP server that executes an EAP authentication method for the secondary authentication of the user equipment 18. Alternatively, the control plane function 14 may serve as a pass-through-authenticator that forwards the EAP request 28 and the EAP response 30 between the user equipment 18 and an EAP server 26 (separate from the EAP authenticator) that executes an EAP authentication method for the EAP authenticator.

Figure 8:
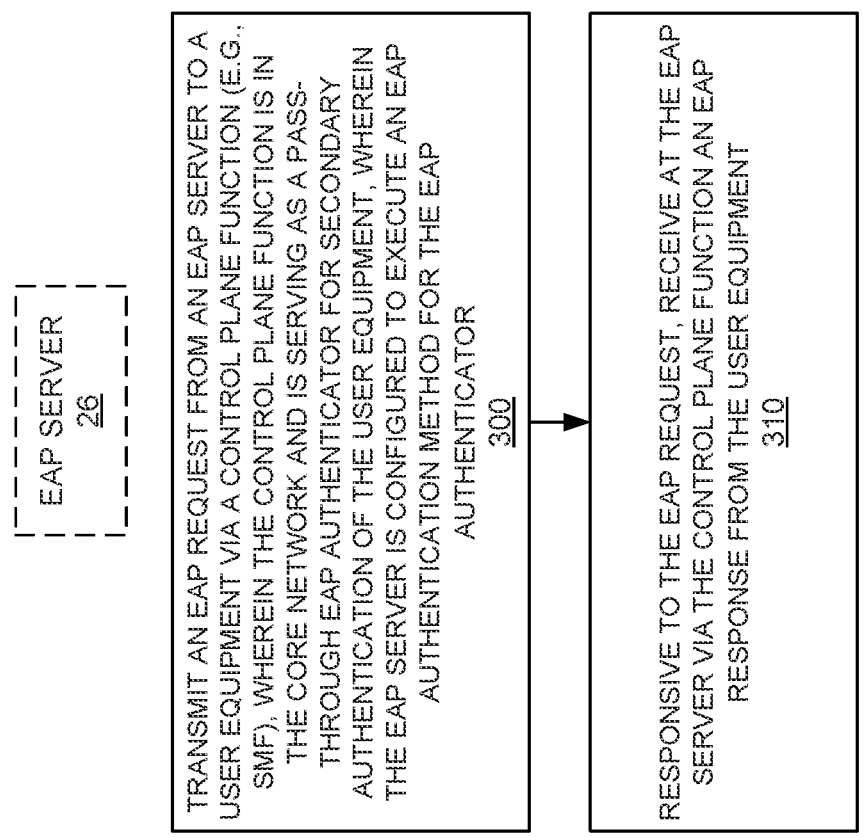
FIG. 8 is a logic flow diagram of a method performed by an EAP server) according to some embodiments.

FIG. 8 in this regard illustrates a method performed by an EAP server 26 for secondary authentication of the user equipment 18. The method may comprise transmitting an extensible authentication protocol (EAP) request 28 from an EAP server 26 to a user equipment 18 via a control plane function 14 (e.g., SMF) (Block 300). The control plane function in this regard is in the core network and is serving as a pass-through EAP authenticator for secondary authentication of the user equipment 18. The secondary authentication may be authentication of the user equipment 18 in addition to primary authentication of the user equipment 18. The EAP server 26 may be configured to execute an EAP authentication method for the EAP authenticator 24. The method may further comprise, responsive to the EAP request 28, receiving at the EAP server 26 via the control plane function 14 an EAP response 30 from the user equipment 18 (Block 310).

In some embodiments, the EAP server 26 is in a data network 22 with which the user equipment 18 requests a user plane session. The secondary authentication of the user equipment 18 may be authentication of the user equipment 18 to establish the user plane session 20. In some embodiments, the secondary authentication is delegated by the wireless communication network to the data network 22.

Note that a network node herein is any type of node in the AN 14 (e.g., a base station) or core network. Where the network node is a radio network node in the AN, the node may be capable of communicating with another node over radio signals. A wireless device is any type device capable of communicating with a radio network node over radio signals. A wireless device may therefore refer to a machine-to-machine (M2M) device, a machine-type communications (MTC) device, a NB-IoT device, etc. The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

The user equipment 18 herein may perform the processing herein by implementing any functional means or units. In one embodiment, for example, the user equipment 18 comprises respective circuits configured to perform the steps shown in FIG. 6. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the user equipment 18 contains instructions executable by the processing circuitry whereby the user equipment 18 is configured to carry out the processing herein.

Figure 9B:
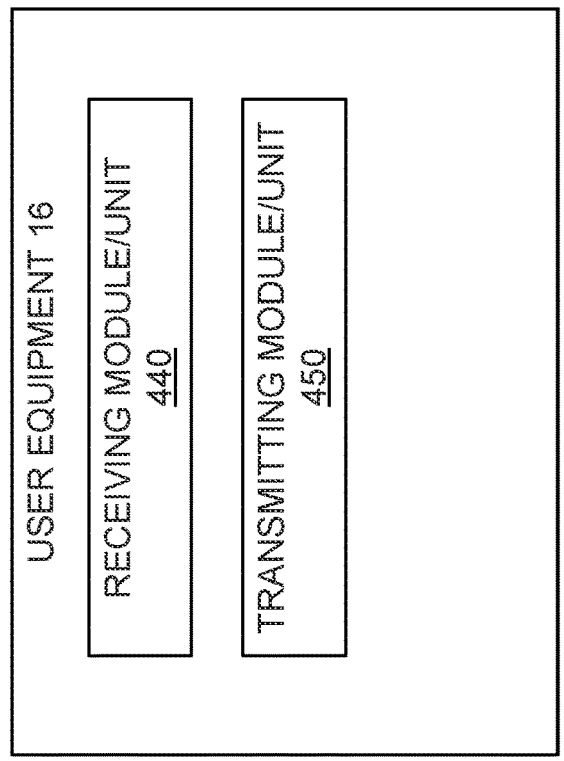
FIG. 9B is a block diagram of a user equipment according to other embodiments.
Figure 9A:
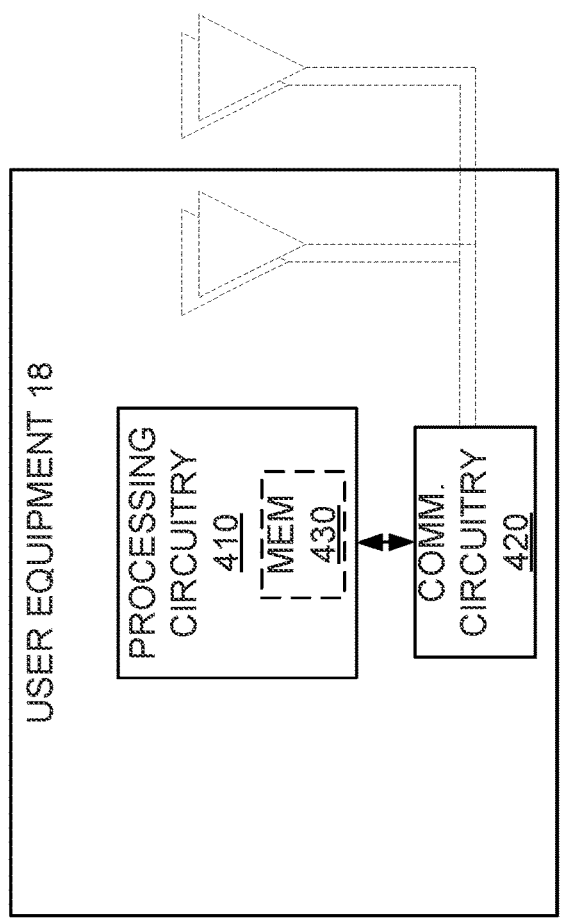
FIG. 9A is a block diagram of a user equipment according to some embodiments.

FIG. 9A illustrates additional details of a user equipment 18 in accordance with one or more embodiments. As shown, the user equipment 18 includes processing circuitry 410 and communication circuitry 420 (e.g., one or more radio circuits). The communication circuitry 420 may be configured to transmit via one or more antennas, which may be internal and/or external to the user equipment 18. The processing circuitry 410 is configured to perform processing described above, e.g., in FIG. 6, such as by executing instructions stored in memory 430. The processing circuitry 410 in this regard may implement certain functional means or units.

FIG. 9B in this regard illustrates additional details of a user equipment 18 in accordance with one or more other embodiments. As shown, the user equipment 18 may include a receiving unit or module 440 for receiving the EAP request 28 and a transmitting unit or module 450 for transmitting the EAP response 30. These units or modules may be implemented by the processing circuitry 410 in FIG. 9A.

Similarly, the control plane function 14 (e.g., SMF) may be provided or implemented by control plane equipment in the control plane. Control plane equipment in this regard may include one or more control plane nodes. Multiple distributed control plane nodes may for instance host or implement the control plane function 14 in a distributed manner. Alternatively, a single control plane node may host or implement the control plane function 14 in a centralized manner.

Control plane equipment herein may perform the processing herein of control plane function 14 by implementing any functional means or units. In one embodiment, for example, the control plane equipment comprises respective circuits configured to perform the steps shown in FIG. 7. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the control plane equipment contains instructions executable by the processing circuitry whereby the control plane equipment is configured to carry out the processing herein.

Figure 10B:
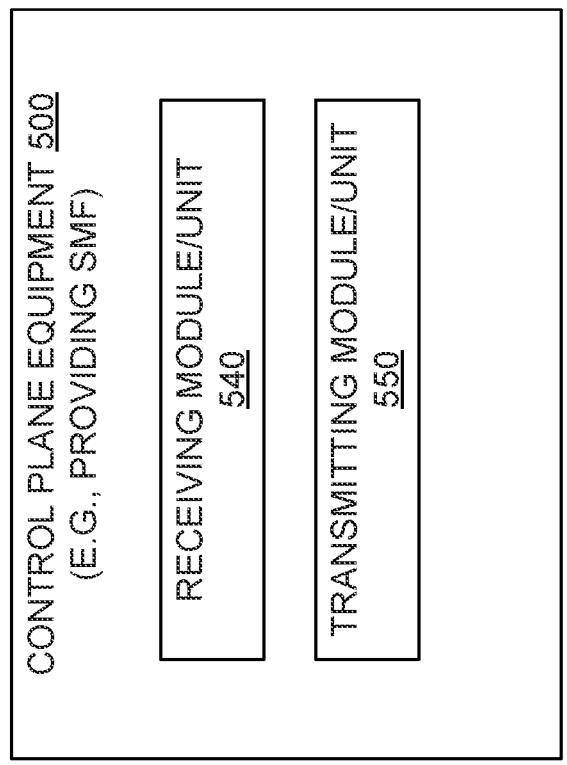
FIG. 10B is a block diagram of control plane equipment according to other embodiments.
Figure 10A:
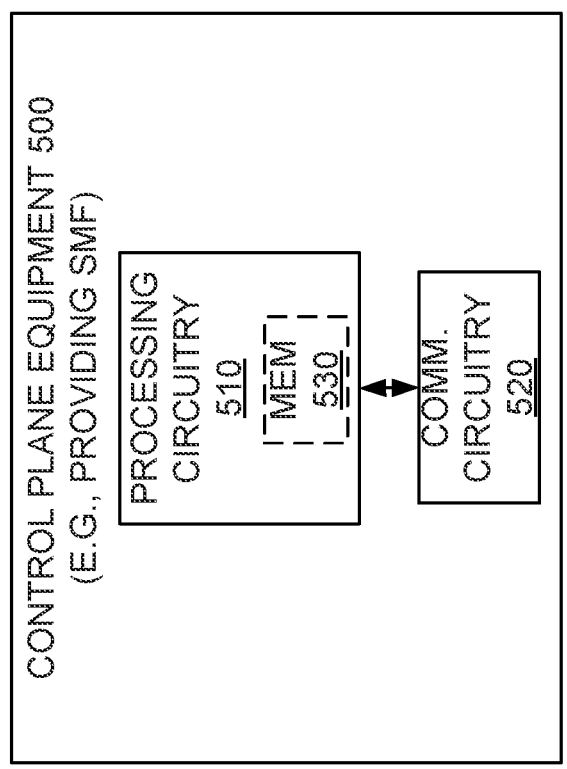
FIG. 10A is a block diagram of control plane equipment according to some embodiments.

FIG. 10A illustrates additional details of control plane equipment 500 in accordance with one or more embodiments. As shown, the control plane equipment 500 includes processing circuitry 510 and communication circuitry 520. The communication circuitry 520 may be configured to communicate with user equipment 18, e.g., via one or more defined interfaces. The processing circuitry 510 is configured to perform processing described above, e.g., in FIG. 7, such as by executing instructions stored in memory 530. The processing circuitry 510 in this regard may implement certain functional means or units.

FIG. 10B in this regard illustrates additional details of control plane equipment 500 in accordance with one or more other embodiments. As shown, the control plane equipment 500 may include a receiving unit or module 540 for receiving the EAP response 30 and a transmitting unit or module 5 for transmitting the EAP request 28. These units or modules may be implemented by the processing circuitry 510 in FIG. 10A.

The EAP server 26 (also referred to as a backend authentication server or authentication server) herein may perform the processing herein by implementing any functional means or units. In one embodiment, for example, the EAP server 26 comprises respective circuits configured to perform the steps shown in FIG. 8. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the EAP server 26 contains instructions executable by the processing circuitry whereby the authentication server 26 is configured to carry out the processing herein.

Figure 11B:
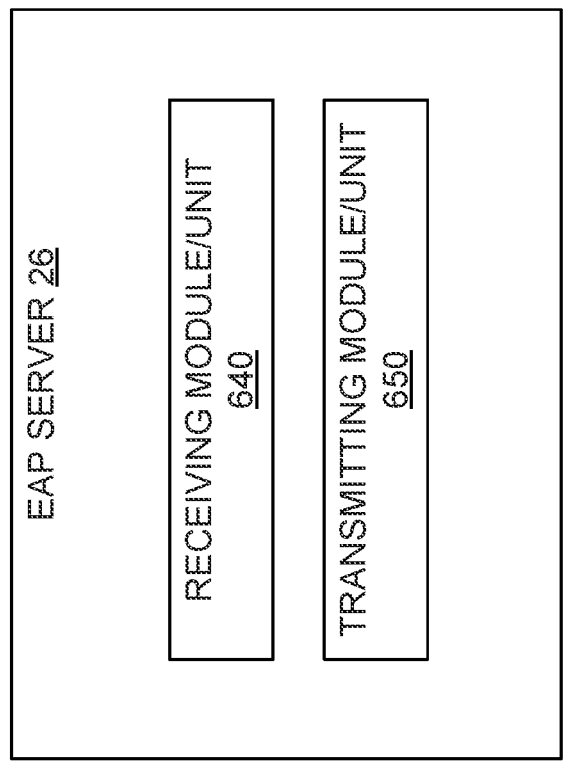
FIG. 11B is a block diagram of an EAP server according to other embodiments.
Figure 11A:
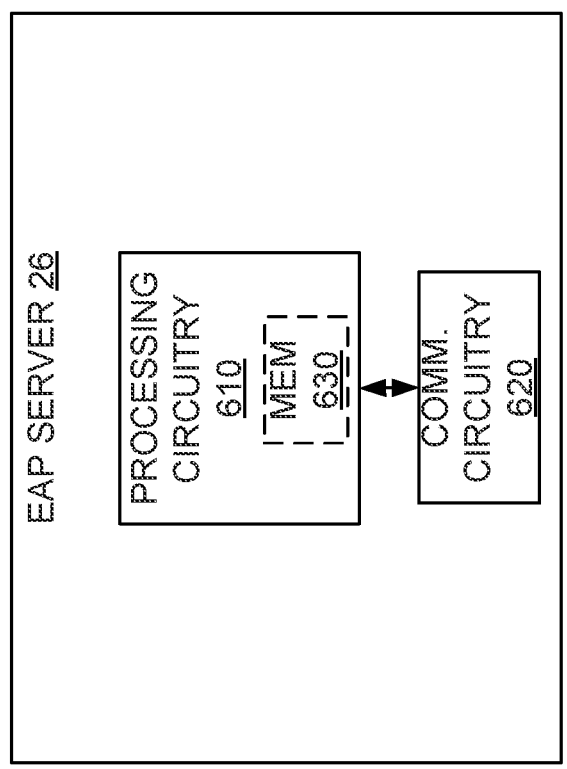
FIG. 11A is a block diagram of an EAP server according to some embodiments.

FIG. 11A illustrates additional details of an EAP server 26 in accordance with one or more embodiments. As shown, the EAP server 26 includes processing circuitry 610 and communication circuitry 620. The communication circuitry 620 may be configured to communicate with the user equipment 18 and/or the control plane function 14, e.g., via one or more defined interfaces. The processing circuitry 610 is configured to perform processing described above, e.g., in FIG. 8, such as by executing instructions stored in memory 630. The processing circuitry 610 in this regard may implement certain functional means or units.

FIG. 11B in this regard illustrates additional details of an EAP server 26 in accordance with one or more other embodiments. As shown, the EAP server 26 may include a receiving unit or module 640 for receiving the EAP response 30 and a transmitting unit or module 650 for transmitting the EAP request 28. These units or modules may be implemented by the processing circuitry 610 in FIG. 11A.

Those skilled in the art will also appreciate that embodiments herein further include corresponding computer programs.

A computer program comprises instructions which, when executed on at least one processor (e.g., of a user equipment 18, control plane equipment 500, or EAP server 26), cause the processor to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

What is claimed is:

1. A method, implemented by a network node of a wireless communication network, the method comprising:
operating a Session Management Function (SMF) in a control plane of a core network of the wireless communication network in support of wireless communication;
authenticating a User Equipment (UE) with an Extensible Authentication Protocol (EAP) server in a secondary authentication process that uses the SMF as an EAP authenticator, the EAP server being comprised in an external network outside of the core network and the UE being separately authenticated with a further network node in the control plane of the core network via a primary authentication process, wherein authenticating the UE in the secondary authentication process comprises exchanging EAP messages between the SMF and the UE and between the SMF and the EAP server;

authorizing, by the SMF, a data session between the UE and the external network through a user plane of the core network based on the UE having successfully authenticated via both the primary authentication process and the secondary authentication process.

2. The method of claim 1, wherein exchanging the EAP messages comprises sending an EAP request from the SMF to the UE and receiving an EAP response from the UE at the SMF in response.

3. The method of claim 2, wherein exchanging the EAP messages comprises:
receiving the EAP request from the EAP server and forwarding the EAP request to the UE;
receiving the EAP response from the UE and forwarding the EAP response to the EAP server.

4. The method of claim 2, wherein the EAP request and the EAP response are encapsulated within respective non-access stratum (NAS) protocol messages between the SMF and the UE.

5. The method of claim 1, further comprising:
receiving, at the SMF, a session establishment request comprising a secondary identity of the UE;
using the secondary identity of the UE, responsive to receiving the session establishment request, to authenticate the UE in the secondary authentication process; and
transmitting a session establishment response comprising an EAP success message indicating that the UE has successfully authenticated via the secondary authentication process.

6. A network node comprising:
processing circuitry and memory, the memory containing instructions executable by the processing circuitry whereby the network node is configured to:
operate a Session Management Function (SMF) in a control plane of a core network of a wireless communication network in support of wireless communication;
authenticate a User Equipment (UE) with an Extensible Authentication Protocol (EAP) server in a secondary authentication process that uses the SMF as an EAP authenticator, the EAP server being comprised in an external network outside of the core network and the UE being separately authenticated with a further network node in the control plane of the core network via a primary authentication process, wherein to authenticate the UE in the secondary authentication process the network node is configured to exchange EAP messages between the SMF and the UE and between the SMF and the EAP server;
authorize, by the SMF, a data session between the UE and the external network through a user plane of the core network based on the UE having successfully authenticated via both the primary authentication process and the secondary authentication process.

7. The network node of claim 6, wherein to exchange the EAP messages the network node is configured to send an EAP request from the SMF to the UE and to receive an EAP response from the UE at the SMF in response.

8. The network node of claim 7, wherein to exchange the EAP messages the network node is configured to:
receive the EAP request from the EAP server and forward the EAP request to the UE; and
receive the EAP response from the UE and forward the EAP response to the EAP server.

9. The network node of claim 7, wherein the EAP request and the EAP response are encapsulated within respective non-access stratum (NAS) protocol messages between the SMF and the UE.

10. The network node of claim 6, wherein the network node is further configured to:
receive, at the SMF, a session establishment request comprising a secondary identity of the UE;
use the secondary identity of the UE, responsive to receiving the session establishment request, to authenticate the UE in the secondary authentication process; and
transmit a session establishment response comprising an EAP success message indicating that the UE has successfully authenticated via the secondary authentication process.

11. A method, implemented by a network node, the method comprising:
exchanging, with a Session Management Function (SMF) comprised in a control plane of a core network of a wireless communication network supporting wireless communication and from an external network outside of the core network, Extensible Authentication Protocol (EAP) messages to authenticate a User Equipment (UE) in a secondary authentication process that uses the SMF as an EAP authenticator, the UE being additionally authenticated with a further network node in the control plane of the core network via a primary authentication process; and
authorizing a data session, through a user plane of the core network and to the external network, that requires successful authentication of the UE via both the primary authentication process and the secondary authentication process.

12. The method of claim 11, wherein exchanging the EAP messages with the SMF comprises sending an EAP request to the SMF and receiving an EAP response from the SMF in response.

13. The method of claim 12, wherein:
sending the EAP request to the SMF comprises sending the EAP request to the UE via the SMF; and
receiving the EAP response from the SMF comprises receiving the EAP response from the UE via the SMF.

14. The method of claim 13, wherein the EAP request and the EAP response are encapsulated within respective non-access stratum (NAS) protocol messages between the SMF and the UE.

15. The method of claim 11, further comprising transmitting a session establishment response to the UE, the session establishment response comprising an EAP success message indicating that the UE has successfully authenticated via the secondary authentication process.

16. A network node comprising:
processing circuitry and memory, the memory containing instructions executable by the processing circuitry whereby the network node is configured to:
exchange, with a Session Management Function (SMF) comprised in a control plane of a core network of a wireless communication network supporting wireless communication and from an external network outside of the core network, Extensible Authentication Protocol (EAP) messages to authenticate a User Equipment (UE) in a secondary authentication process that uses the SMF as an EAP authenticator, the UE being separately authenticated with a further network node in the control plane of the core network via a primary authentication process; and authorizing a data session, through a user plane of the core network and to the external network, that requires successful authentication of the UE via both the primary authentication process and the secondary authentication process.

17. The network node of claim 16, wherein to exchange the EAP messages with the SMF, the network node is configured to send an EAP request to the SMF and receive an EAP response from the SMF in response.

18. The network node of claim 17, wherein:
to send the EAP request to the SMF, the network node is configured to send the EAP request to the UE via the SMF; and
to receive the EAP response from the SMF, the network node is configured to receive the EAP response from the UE via the SMF.

19. The network node of claim 18, wherein the EAP request and the EAP response are encapsulated within respective non-access stratum (NAS) protocol messages between the SMF and the UE.

20. The network node of claim 16, wherein the network node is further configured to transmit a session establishment response to the UE, the session establishment response comprising an EAP success message indicating that the UE has successfully authenticated via the secondary authentication process.

* * * * *

UNITED STATES PATENT AND TRADEMARK OFFICE
CERTIFICATE OF CORRECTION

PATENT NO. : 11,895,229 B2
APPLICATION NO. : 18/149826
DATED : February 6, 2024
INVENTOR(S) : Ben Henda et al.

Page 1 of 2

It is certified that error appears in the above-identified patent and that said Letters Patent is hereby corrected as shown below:

On the Title Page

Item (54), in Title, in Column 1, Line 1, delete "STATES SECONDARY" and insert
-- SECONDARY --, therefor.

Item (56), under "OTHER PUBLICATIONS", in Column 2, Line 37, delete "mans" and insert
-- means --, therefor.

In the Drawings

In Fig. 3, Sheet 3 of 10, delete "establishement" and insert -- establishment --, therefor.

In the Specification

In Column 1, in Title, Line 1, delete "STATES SECONDARY" and insert -- SECONDARY --,
therefor.

In Column 1, Line 7, delete "2019," and insert -- 2019, now U.S. Pat. No. 11,575,509, --, therefor.

In Column 4, Line 21, delete "server)" and insert -- server --, therefor.

In Column 7, Line 3, delete "that can that can" and insert -- that can --, therefor.

In Column 8, Line 9, delete "Infra-/Inter-radio" and insert -- Intra-/Inter-radio --, therefor.

In Column 8, Line 48, delete "customer-specific" and insert -- customer-specific. --, therefor.

In Column 11, Line 18, delete "carried" and insert -- carries --, therefor.

Signed and Sealed this
Twenty-second Day of October, 2024

Katherine Kelly Vidal
*Director of the United States Patent and Trademark Office*

In Column 13, Line 24, delete "are" and insert -- be --, therefor.

In Column 14, Line 26, delete "type" and insert -- type of --, therefor.

In Column 14, Line 41, delete "equipped" and insert -- equipment --, therefor.

In Column 14, Line 50, delete "IOT" and insert -- IoT --, therefor.